(12) United States Patent
Kalyanasamy et al.

(10) Patent No.: US 12,234,741 B2
(45) Date of Patent: Feb. 25, 2025

(54) THERMAL ENERGY SYSTEM TO MINIMIZE OR ELIMINATE ROTOR BOW

(71) Applicants: Rolls-Royce North American Technologies, Inc., Indianapolis, IN (US); Rolls-Royce Corporation, Indianapolis, IN (US)

(72) Inventors: Govindaraj Kalyanasamy, Indianapolis, IN (US); Peter Schenk, Indianapolis, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/304,037

(22) Filed: Apr. 20, 2023

(65) Prior Publication Data

US 2024/0352872 A1   Oct. 24, 2024

(51) Int. Cl.
| | |
|---|---|
| F01D 25/10 | (2006.01) |
| F01D 5/18  | (2006.01) |
| F01D 19/02 | (2006.01) |
| F02C 9/00  | (2006.01) |

(52) U.S. Cl.
CPC .............. F01D 25/10 (2013.01); F01D 5/18 (2013.01); F01D 19/02 (2013.01); F02C 9/00 (2013.01)

(58) Field of Classification Search
CPC . F01D 25/10; F01D 25/08; F01D 5/08; F01D 5/18; F01D 19/02; F01D 21/12; F01D 25/02; F04D 29/584; F04D 29/5853; F04D 29/582; F05D 2260/20; F05D 2270/303; F05D 2270/3032; F02C 7/047; F02C 6/00; F02C 7/12; F02C 9/00
See application file for complete search history.

(56) References Cited

U.S. PATENT DOCUMENTS

| | | | |
|---|---|---|---|
| 5,172,553 A  * | 12/1992 | Barton ................ | F01D 25/10 60/656 |
| 7,114,915 B2 | 10/2006 | Uematsu et al. | |
| 7,937,949 B2 | 5/2011 | Eccles et al. | |
| 9,428,267 B2 | 8/2016 | DeVita et al. | |

(Continued)

FOREIGN PATENT DOCUMENTS

| | | | | |
|---|---|---|---|---|
| EP | 0537307 A1 * | 4/1993 | ............ | F01D 25/10 |
| EP | 2881563 A1 * | 6/2015 | ................ | F02C 6/18 |

(Continued)

OTHER PUBLICATIONS

EP 0537307 English Language Machine Translation (Year: 1993).*

(Continued)

*Primary Examiner* — Wesley G Harris
(74) *Attorney, Agent, or Firm* — Shumaker & Sieffert, P.A.

(57) ABSTRACT

An example system includes one or more heaters configured and positioned to add thermal energy to one or more portions of a gas turbine engine after the gas turbine engine was in operation, wherein the thermal energy minimizes or prevents undesired contact or seizing of a rotor of the gas turbine engine with another component of the gas turbine engine due to warping of the rotor due to uneven cooling of the gas turbine engine after the operation. The system further includes a controller configured to control operation of the one or more heaters.

16 Claims, 8 Drawing Sheets

(56) References Cited

U.S. PATENT DOCUMENTS

| | | | |
|---|---|---|---|
| 10,125,636 B2 | 11/2018 | Dube et al. | |
| 2009/0092491 A1* | 4/2009 | Cairo | F04D 29/322 416/61 |
| 2011/0232294 A1 | 9/2011 | Ross et al. | |
| 2011/0236182 A1* | 9/2011 | Wiebe | F01D 11/20 415/173.1 |
| 2013/0091850 A1* | 4/2013 | Francisco | F02C 7/32 60/39.83 |
| 2017/0335772 A1 | 11/2017 | Coldwate et al. | |
| 2018/0209342 A1 | 7/2018 | Pearson et al. | |
| 2019/0162203 A1 | 5/2019 | Shinde et al. | |
| 2020/0109639 A1* | 4/2020 | Namadevan | F01D 9/06 |

FOREIGN PATENT DOCUMENTS

| | | | | |
|---|---|---|---|---|
| EP | 3273035 A1 | * | 1/2018 | F01D 25/24 |
| ES | 2029430 A6 | * | 8/1992 | F01D 17/085 |
| FR | 2943717 A1 | * | 10/2010 | F01D 11/025 |
| GB | 2117842 A | | 10/1983 | |

OTHER PUBLICATIONS

EP 2029430 English Language Machine Translation (Year: 1992).*
U.S. Appl. No. 18/304,129, filed Apr. 20, 2023, naming inventors Kalyanasamy et al.
Office Action from U.S. Appl. No. 18/304,129 dated Apr. 16, 2024, 18 pp.
Wikipedia, "Heat Pipe", Apr. 2023, 17 pp., Retrieved from https://en.wikipedia.org/w/index.php?title=Heat_pipe&oldid=1148329703.
Response to Office Action dated Apr. 16, 2024 from U.S. Appl. No. 18/304,129 filed Jul. 16, 2024, 12 pp.
Final Office Action from U.S. Appl. No. 18/304,129 dated Oct. 21, 2024, 18 pp.
Advisory Action from U.S. Patent Application No. 18/304, 129 dated Jan. 7, 2025, 2 pp.
Response to Final Office Action dated Oct. 21, 2024 from U.S. Patent Application No. 18/304, 129 filed Dec. 23, 2024, 10 pp.

\* cited by examiner

THERMAL ENERGY SYSTEM TO MINIMIZE OR ELIMINATE ROTOR BOW

TECHNICAL FIELD

The present disclosure relates to gas turbine engine systems that are used, in some examples, for powered vehicles, such as aircraft.

BACKGROUND

A gas turbine engine is a type of internal combustion engine that may be used to power an aircraft, or another moving vehicle such as a marine vehicle. The turbine in a gas turbine engine may be coupled to a rotating compressor that increases a pressure of fluid flowing into the turbine. A combustor may add fuel to the compressed fluid and combust the fuel/fluid combination. The combusted fluid may enter the turbine, where it expands, causing a shaft to rotate. The rotating shaft may drive a propulsor, and the propulsor may use the energy from the rotating shaft to provide propulsion for the system.

SUMMARY

In accordance with one or more aspects of this disclosure, a thermal energy system may be configured to manage thermal energy associated with an operation of a vehicle after the vehicle has been in operation. The thermal energy system may be configured to add or transport thermal energy such that undesired contact between components, such as a rotor and a case, is reduced or minimized. Management of thermal energy associated with operation of the vehicle may allow for restarting an engine without waiting for the engine to completely cool. The described techniques and systems may be implemented while the rotor is substantially stationary (e.g., stationary or nearly stationary), so a barring operation may not be necessary.

In some examples, the disclosure is directed to a thermal energy system which includes one or more heaters configured and positioned to add thermal energy to one or more portions of a gas turbine engine after the gas turbine engine was in operation. The added thermal energy minimizes or prevents undesired contact or seizing of a rotor of the gas turbine engine with another component of the gas turbine engine due to warping of the rotor due to uneven cooling of the gas turbine engine after the operation. The thermal energy system also includes a controller configured to control operation of the one or more heaters.

In some examples, the disclosure is directed to a technique which includes determining, by a controller, that operation of a gas turbine engine has concluded. Responsive to determining that the operation concluded, the technique includes causing, by the controller, one or more heaters to add thermal energy to one or more portions of the gas turbine engine. The thermal energy is configured to minimize or prevent undesired contact or seizing of a rotor with another component of the gas turbine engine due to warping of the rotor due to uneven cooling of the gas turbine engine after the operation.

In some examples, the disclosure is directed to a thermal energy system configured to transport thermal energy harvested from a first portion of a gas turbine engine to a second portion of the gas turbine engine after the gas turbine engine was in operation. The transported thermal energy minimizes or prevents undesired contact or seizing of a rotor with another component of the gas turbine engine due to warping of the rotor due to uneven cooling of the gas turbine engine after the operation. The thermal energy system includes a cavity configured to flow a fluid, wherein the fluid is configured to transport thermal energy from the first portion to the second portion.

In some examples, the disclosure is directed to a technique which includes performing an operation of a gas turbine engine. The technique also includes transporting, subsequent to performing the operation and via a thermal energy system, thermal energy from a first portion of the gas turbine engine to a second portion of the gas turbine engine. The thermal energy is configured to minimize or prevent undesired contact or seizing of a rotor with another component of the gas turbine engine due to warping of the rotor due to uneven cooling of the gas turbine engine after the operation. Transporting the thermal energy includes flowing a fluid through a cavity from the first portion to the second portion.

The details of one or more examples are set forth in the accompanying drawings and the description below. Other features, objects, and advantages will be apparent from the description and drawings, and from the claims.

DETAILED DESCRIPTION

Figure 1:
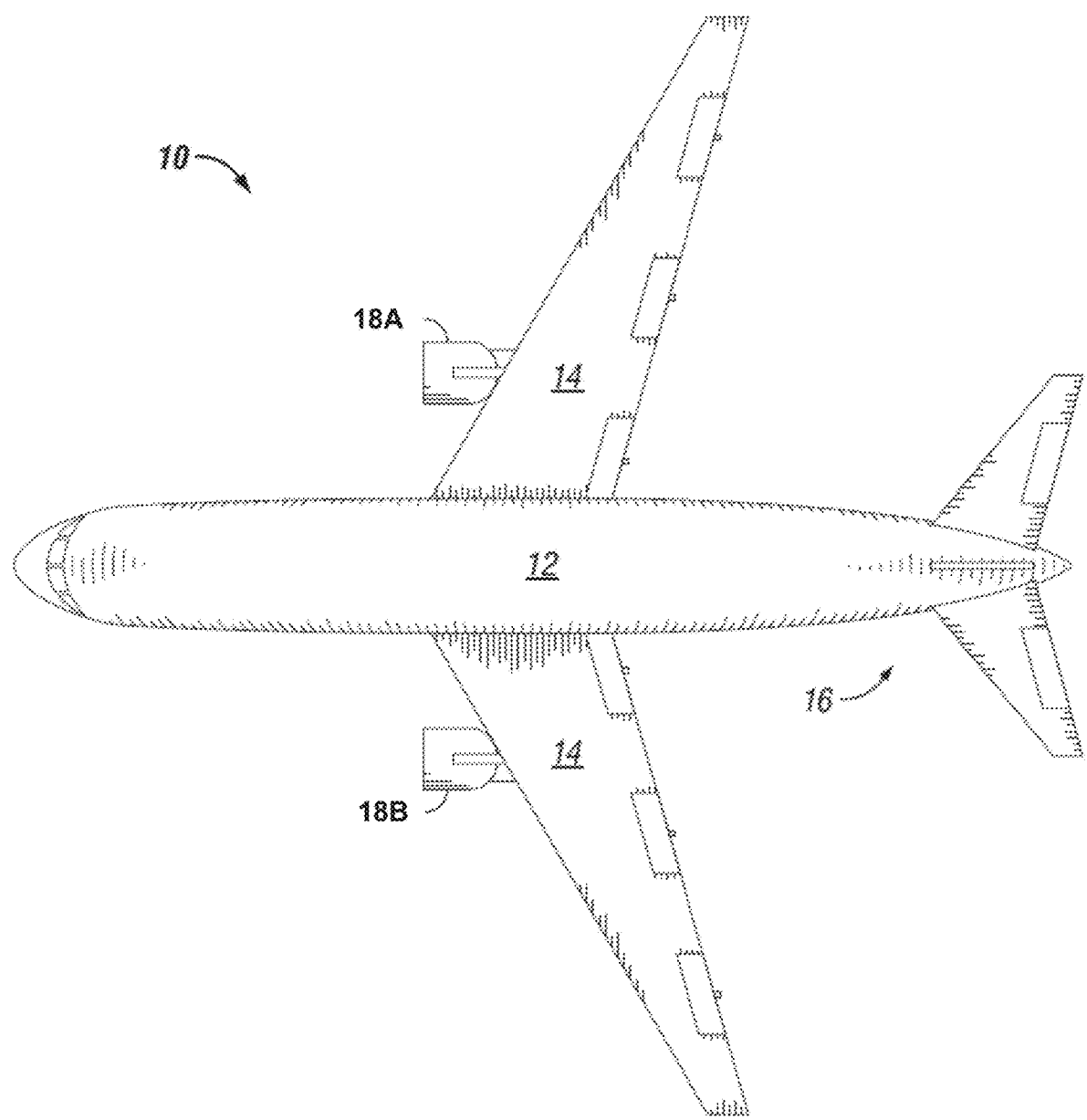
FIG. 1 is a conceptual diagram illustrating an example vehicle in accordance with an example of the present disclosure.

The present disclosure is directed to gas turbine engine systems, e.g., for gas turbine engine powered vehicles such an aircraft, and techniques for operating the same. For ease of description, examples of the disclosure will be primarily described in the context of aircraft as a gas turbine engine powered vehicle. However, examples of the disclosure are not limited to aircraft. For instance, aspects of this disclosure may be applicable to gas turbine powered ground vehicles, watercraft, and the like.

In general, this disclosure describes techniques and associated systems that promote even heat dissipation in gas turbine engines. When an operation (e.g., a propulsive operation, such as a flight) concludes, the gas turbine engine may be shut off, but various components of the gas turbine engine may retain thermal energy that resulted from operation of the gas turbine engine. Since higher thermal energy fluids have as a tendency to rise, or migrate upwards in a gravity field against the force of gravity due to their reduced density, the retained thermal energy may be unevenly distributed in different portions of the gas turbine engine. For example, a relatively hot portion may develop at the top of the gas turbine engine while a relatively cold portion of the gas turbine engine may develop at the bottom of the gas turbine engine.

As the components cool, the components may slightly change size. For certain components, such as rotors or other components with tight clearances, uneven cooling may be undesirable. For instance, uneven cooling may result in the components undesired contact or seizing, which may frustrate re-start of the gas turbine engine until additional cooling has occurred. The uneven cooling may result in warping of the rotor in a radial direction because thermal expansion of the rotor may be different in different portions of the gas turbine engine because a temperature gradient may be caused by the uneven cooling. This condition may be referred to as "rotor bow."

One way to mitigate or prevent rotor bow may be to rotate the rotor after the operation as the gas turbine engine cools, which may be called barring. Since thermal energy retained by the engine has a tendency to rise, rotation of the rotor by, for example, a barring motor may reduce the likelihood that an upper portion of the gas turbine engine becomes relatively hot when compared to a lower portion of the gas turbine engine during a cooling period after an operation. However, in some situations barring may be undesirable, such as when other maintenance related to the vehicle may prevent rotation of the rotor. For example, the vehicle may be a regional aircraft which may have only a relatively short time on the ground for maintenance between flights, and may not be allowed to wait for a bowed rotor to cool such that it may restart, but also may be prohibited from executing a barring operation due to regulations, or safety or other maintenance operations. For example, engine rotation within an aircraft carrier bay may not be allowed per policy. In such circumstances and other circumstances, it may be desirable to provide an alternative to barring that minimizes or prevents undesired contact, such as rubbing, between a warped or bent rotor and an associated component (e.g., a case).

In one or more examples, techniques and systems according to the present disclosure may include a thermal energy system configured to manage thermal energy associated with an operation of the vehicle after the operation has concluded such that undesired contact between components, such as the rotor and the case, is reduced or minimized, which may allow the engine to restart without waiting for the engine to completely cool. The techniques and systems may be implemented while the rotor is substantially stationary (e.g., stationary or nearly stationary), so a barring operation may not be necessary.

In accordance with one or more aspects of this disclosure, in some examples, the thermal energy system may counterintuitively be configured to add heat to one or more portions of the gas turbine engine to reduce or eliminate deleterious effects of rotor bow. For example, thermal energy (e.g., heat) may be added to a second portion (e.g., a portion below an engine centerline) of the gas turbine engine such that a temperature in the second portion may substantially match (e.g., match or fall within a threshold matching percentage, such as 5%) of a temperature in a first portion (e.g., a portion above an engine centerline). In some examples, the controller may be configured to cease adding or transporting thermal energy once the temperature in the second portion reaches this temperature threshold, which may allow for smaller batteries and/or less energy consumption while still addressing rotor bow. In some examples, the second portion may be above an engine centerline, for example to thermally expand the case in a similar fashion to the rotor. In this way, undesired contact between the case and rotor may be reduced or eliminated.

The added thermal energy may, in some examples, be generated onboard the vehicle, such as from a battery pack. Additionally, or alternatively in some examples, the thermal energy may be generated onboard the vehicle using energy sourced outside the aircraft, such as electrical energy from ground power, shore power, marine power, or the like. The thermal energy may be added to the rotor through inductive heating, such as by routing the thermal energy through inductive material through a hollow vane. Additionally, or alternatively, the thermal energy may be added to the case, such as an outside surface of the case, through one or more electrical heaters (e.g., heater mats).

Additionally, or alternatively, techniques and systems according to the present disclosure may include a thermal energy system configured to transport thermal energy harvested from a first portion of the gas turbine engine to a second portion of the gas turbine engine after the operation of the gas turbine engine. In this way, undesired contact or seizing of a rotor with another component of the gas turbine engine due to warping of the rotor due to uneven cooling of the gas turbine engine after the operation by redistributing the thermal energy generated during the operation such that the gas turbine engine more evenly cools. In some examples, the thermal energy may be transported from the first portion to the second portion through a cavity configured to flow a fluid, where the fluid is configured to transport the thermal energy. In some examples, the fluid may be hot air that is forced through a duct by an electric fan, for example from an upper portion to a lower portion of the gas turbine engine. In some examples, the fluid may include an oil or a refrigerant, which may flow from a first portion of the gas turbine engine through a cavity contained within a jacket or network of heat pipes.

In some examples, the thermal energy system may be configured to add or transport thermal energy throughout the cooling process from the conclusion of an operation (e.g., a flight) until the engine is cooled to ambient temperatures. In some examples, the thermal energy system may add or transport thermal energy during a time period that begins after the operation of the gas turbine engine concludes and then cease adding or transporting thermal energy. In some examples, the time period may be from about 15 minutes to about 5 hours in duration. The time period may be divided into a first segment and a second segments, and more thermal energy may be added or transported during the during the first segment than the second segment. In this way, the thermal energy system may substantially match the temperature in one portion of the gas turbine engine with another portion of the gas turbine engine to minimize or eliminate undesired contact or seizing of the engine. Substantially matching temperatures, as used herein, include equal temperatures or those temperatures that are within a threshold percentage of each other (e.g., within about 10%, or within about 20%, or within about 30%, when measured in Kelvin).

In some examples, the thermal energy system may include a temperature sensor in the first portion of the engine and a temperature sensor in the second portion of the gas turbine engine. The thermal energy system may be configured to sense a temperature in a first (e.g., a relatively hot) portion of the gas turbine engine and add thermal energy to a second portion or In some examples of the gas turbine engine system, the rotor may not include a mechanical support for the rotor in a central rotor portion located between a first end of the rotor and the second end of the rotor. For instance, the gas turbine engine may not include a center sump (e.g., in an effort to increase efficiency, improve secondary flow and reduce weight of the gas turbine engine system). However, when the gas turbine engine is shut off, the heat produced by the gas turbine engine may warp a rotor of the gas turbine engine such that the rotor may contact a compressor of the engine and/or lock-up inside a compressor of the engine. In addition, uneven heating may cause the tight clearances between shafts and top clearances on airfoils to close. When a rotor becomes locked-up, it may take prolonged time at rest to cool the rotor sufficiently to allow for clearance to be restored. Thermal energy systems according to the present disclosure may be suited for mitigating warping of the rotor, or deleterious effects associated with warping of the rotor such as undesired contact with the rotor with another system, in such systems.

FIG. 1 is a conceptual diagram illustrating an example vehicle in accordance with an example of the present disclosure. In the example of FIG. 1, the vehicle includes an aircraft 10. In other examples, the vehicle may include any type of gas turbine engine-powered vehicle, including one or more types of air vehicles; land vehicles, including but not limited to, tracked and/or wheeled vehicles; marine vehicles, including but not limited to surface vessels, submarines, and/or semi-submersibles; amphibious vehicles; or any combination of one or more types of air, land, and marine vehicles. The vehicle may be manned, semiautonomous, or autonomous.

Aircraft 10 includes a fuselage 12, wings 14, an empennage 16, two gas turbine engine systems 18A and 18B (collectively, "gas turbine engines 18") as main propulsion engines. In other examples, aircraft 10 may include a single gas turbine engine 18 or a plurality of gas turbine engines 18. As illustrated in FIG. 1, aircraft 10 is a twin-engine turbofan aircraft. In some examples, aircraft 10 may be any fixed-wing aircraft, including turbofan aircraft, turbojet aircraft, and turboprop aircraft. In some examples, aircraft 10 may be a rotary-wing aircraft or a combination rotary-wing/fixed-wing aircraft (e.g., VTOL, STOL, etc.). Aircraft 10 may employ any number of wings 14. Empennage 16 may employ a single or multiple flight control surfaces. Gas turbine engines 18 may be the main propulsion systems of aircraft 10. Aircraft may also have more than two engines such as three or four engines or may have a single engine.

One or both of gas turbine engine systems 18A and 18B may include an HP spool, one or more lower pressure (LP) spools (e.g., a single low-pressure spool or a low-pressure spool and one or more intermediate pressure (IP) spools), and a generator coupled to a rotating shaft of a lower pressure (LP) spool. The systems may be configured such that the generator generates power from the rotation of the LP shaft, which results in a torque applied to the LP shaft. In some examples, when a gas turbine engine 18A, 18B is shut off, various components of the gas turbine engine 18A, 18B may retain heat that resulted from operation of the gas turbine engine 18A, 18B. As the components cool, the components may slightly change size. For certain components, such as rotors or other components with tight clearances, uneven cooling may be undesirable. For instance, uneven cooling may result in the components seizing, which may frustrate re-start of the gas turbine engine 18A, 18B until additional cooling has occurred. In accordance with some examples of this disclosure, a thermal energy system may add or transport thermal energy to one or more portions of gas turbine engine 18A, 18B after gas turbine engine 18A, 18B has been shut off.

Figure 2:
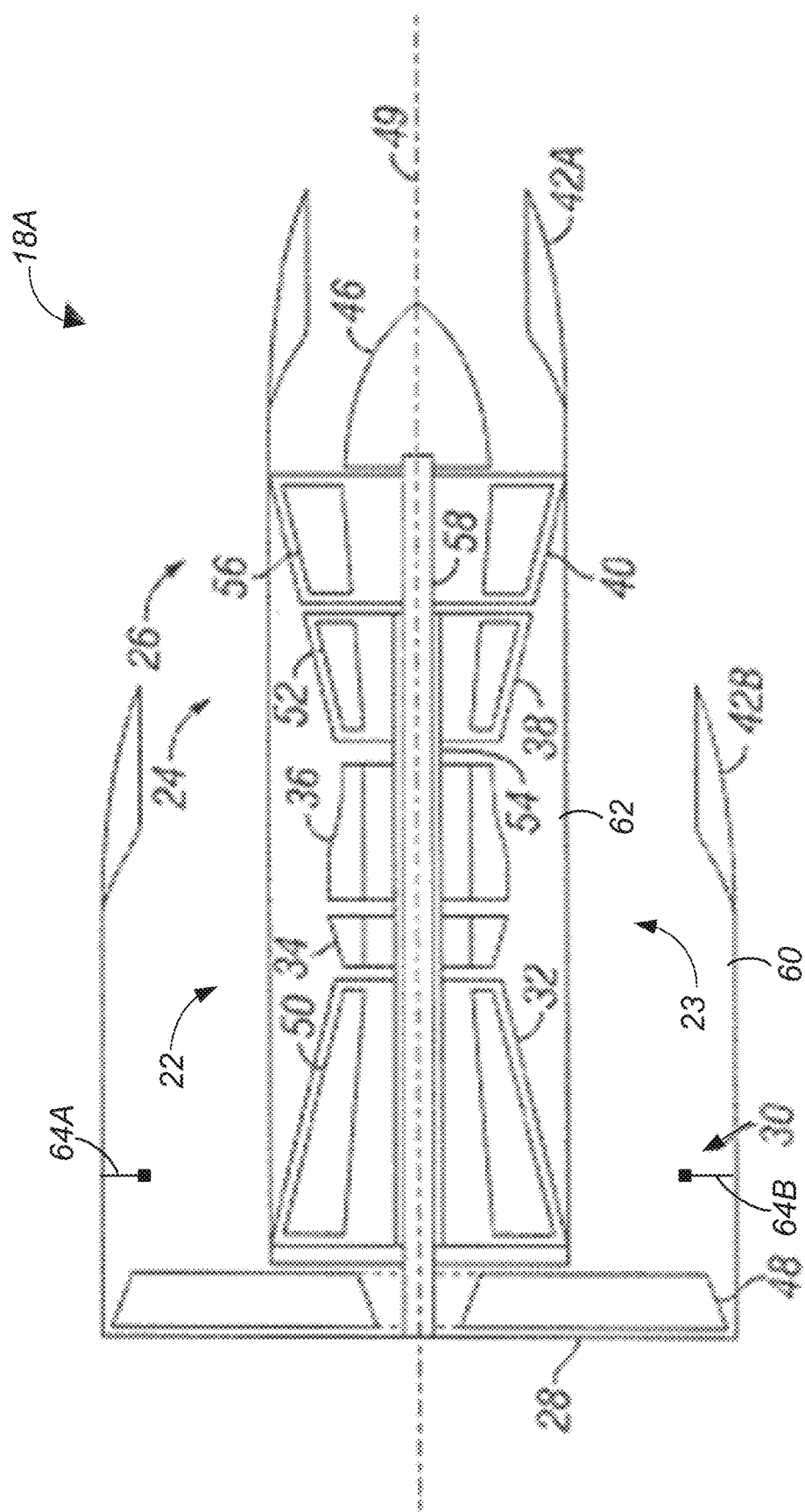
FIG. 2 is a conceptual diagram illustrating a cross-sectional view of a gas turbine engine systems in accordance with one or more examples of the present disclosure.

FIG. 2 is a conceptual and schematic diagram illustrating gas turbine engine system 18A in accordance with an example of the present disclosure. Although described herein as with respect to an aircraft propulsion system, in other examples, gas turbine engine 18A may be a propulsion system for providing propulsive thrust to any type of gas turbine engine powered vehicle, as discussed above, or configured to provide power any suitable nonvehicle system including gas turbine engine 18A. Engine 18B may be the same or similar to engine 18A in FIG. 1.

Engine 18A may be a primary propulsion engine that provides thrust for flight operations of aircraft 10. In the example of FIG. 2A, engine 18A is a two-spool engine having a high-pressure (HP) spool (rotor) 24 and a low-pressure (LP) spool (rotor) 26. As used herein, the entire spool 24, 26 may be referred to generally as a rotor. In other examples, engine 18A may include three or more spools, e.g., may include an IP spool and/or other spools and/or partial spools, e.g., on-axis or off-axis compressor and/or turbine stages (i.e., stages that rotate about an axis that is the same or different than that of the primary spool(s)). In one form, engine 18A is a turbofan engine. In other examples, engine 18A may be any other type of gas turbine engine, such as a turboprop engine, a turboshaft engine, a propfan engine, a turbojet engine or a hybrid or combined cycle engine. As a turbofan engine, low-pressure spool 26 may be operative to drive a propulsor 28 in the form of a fan, which may be referred to as a fan system. As a turboprop engine, low-pressure spool 26 powers a propulsor 28 in the form of a propeller system (not shown), e.g., via a reduction gearbox (not shown). In other examples, propulsor 28 may take other forms, such as one or more helicopter rotors or tilt-wing aircraft rotors, for example, powered by one or more engines 18A in the form of one or more turboshaft engines.

HP spool 24 and LP spool 26 may each extend from a first end to a second end (ends not labeled in FIG. 2 for clarity). A central rotor segment may be defined between the first end and the second end. In some examples, the central rotor segment may be defined as 50% of the axial rotor length surrounding a midpoint between the first end and the second end. In some examples, HP spool 24, LP spool 26, or both may not be mechanically supported in the central rotor segment. As mentioned above, a rotor which is not mechanically supported may provide opportunities for space or weight reductions, but may be relatively more susceptible to rotor bow than a mechanically supported rotor.

In some examples, engine 18A includes, in addition to propulsor 28, a bypass duct 30 defined between outer case 60 and core case 62, a high-pressure (HP) compressor 32, a diffuser 34, a combustor 36, a high-pressure (HP) turbine 38, a low-pressure turbine 40, a nozzle 42A, a nozzle 42B, and a tailcone 46, which are generally disposed about and/or rotate about an engine centerline 49. In other examples, there may be, for example, an intermediate pressure spool having an intermediate pressure turbine or other turbomachinery components, such as those mentioned above. In some examples, engine centerline 49 is the axis of rotation of propulsor 28, HP compressor 32, HP turbine 38 and turbine 40. In other examples, one or more of propulsor 28, HP compressor 32, HP turbine 38 and turbine 40 may rotate about a different axis of rotation.

In the depicted example, engine 18A core flow is discharged through nozzle 42A, and the bypass flow from propulsor 28 is discharged through nozzle 42B. In other examples, other nozzle arrangements may be employed, e.g., a common nozzle for core and bypass flow; a nozzle for core flow, but no nozzle for bypass flow; or another nozzle arrangement. Bypass duct 30 and HP compressor 32 are in fluid communication with propulsor 28. Nozzle 42B is in fluid communication with bypass duct 30. Diffuser 34 is in fluid communication with HP compressor 32. Combustor 36 is fluidly disposed between HP compressor 32 and HP turbine 38. Turbine 40 is fluidly disposed between HP turbine 38 and nozzle 42A. In one form, combustor 36 includes a combustion liner (not shown) that contains a continuous combustion process. In other examples, combustor 36 may take other forms, and may be, for example, a wave rotor combustion system, a rotary valve combustion system, a pulse detonation combustion system, a continuous detonation combustion system and/or a slinger combustion system, and may employ deflagration and/or detonation combustion processes.

Propulsor 28 may include a fan rotor system 48 driven by low-pressure spool 26. In various examples, fan rotor system 48 may include one or more rotors that are powered by turbine 40. In various examples, propulsor 28 may include one or more fan vane stages (not shown in FIG. 2) that cooperate with fan blades (not shown) of fan rotor system 48 to compress air and to generate a thrust-producing flow. Bypass duct 30 is operative to transmit a bypass flow generated by propulsor 28 around the core of engine 18A within core case 62. HP compressor 32 includes a compressor rotor system 50. In various examples, compressor rotor system 50 includes one or more rotors (not shown) that are powered by HP turbine 38. HP compressor 32 also includes a plurality of compressor vane stages (not shown in FIG. 2A) that cooperate with compressor blades (not shown) of compressor rotor system 50 to compress air. In various examples, the compressor vane stages may include a compressor discharge vane stage and/or one or more diffuser vane stages. In one form, the compressor vane stages are stationary.

HP turbine 38 includes a turbine rotor system 52. In various examples, turbine rotor system 52 includes one or more rotors having turbine blades (not shown) operative to extract power from the hot gases flowing through HP turbine 38 (not shown), to drive compressor rotor system 50. HP turbine 38 also includes a plurality of turbine vane stages (not shown) that cooperate with the turbine blades of turbine rotor system 52 to extract power from the hot gases discharged by combustor 36. In one form, the turbine vane stages are stationary. In other examples, one or more vane stages may be replaced with one or more counter-rotating blade stages. Turbine rotor system 52 is drivingly coupled to compressor rotor system 50 via a shafting system 54 (also referred to as high-pressure (HP) shaft 54). Turbine 40 includes a turbine rotor system 56. In various examples, turbine rotor system 56 includes one or more rotors having turbine blades (not shown) operative to drive fan rotor system 48. Turbine 40 may also include a plurality of turbine vane stages (not shown in FIG. 2) that cooperate with the turbine blades of turbine rotor system 56 to extract power from the hot gases discharged by HP turbine 38. In one form, the turbine vane stages are stationary. Turbine rotor system 56 is drivingly coupled to fan rotor system 48 via shafting system 58 (also referred to as low-pressure shaft 58). In various examples, shafting systems 54 and 58 include a plurality of shafts that may rotate at the same or different speeds and directions for driving fan rotor system 48 rotor(s) and compressor rotor system 50 rotor(s). For case of description, shafting system 54 of HP spool 24 is described primarily as HP shaft 54 but is it recognized that system 54 is not limited to a single shaft. Likewise, shafting system 58 of low-pressure spool 26 is described primarily as low-pressure shaft 58 but is it recognized that system 58 is not limited to a single shaft. Turbine 40 is operative to discharge the engine 18A core flow to nozzle 42A.

During normal operation of gas turbine engine 18A, air is drawn into the inlet of propulsor 28 and pressurized. Some of the air pressurized by propulsor 28 is directed into HP compressor 32 as core flow, and some of the pressurized air is directed into bypass duct 30 as bypass flow. HP compressor 32 further pressurizes the portion of the air received therein from propulsor 28, which is then discharged into diffuser 34. Diffuser 34 reduces the velocity of the pressurized air, and directs the diffused core airflow into combustor 36. Fuel is mixed with the pressurized air in combustor 36, which is then combusted. The hot gases exiting combustor 36 are directed into turbines 38 and 40, which extract energy in the form of mechanical shaft power to drive HP compressor 32 and propulsor 28 via respective HP shaft 54 and low-pressure shaft 58. The hot gases exiting turbine 40 are discharged through nozzle system 42A, and provide a component of the thrust output by engine 18A.

As mentioned above, thermal energy created during operation of engine 18A may be retained in engine 18A at conclusion of the operation. For example, engine 18A may land and be shut-off after a propulsive operation such as a flight. The retained thermal energy may naturally migrate upward to a first portion 22 of engine 18A, which is located above engine centerline 49. Second portion 23 of engine 18A may thus become relatively colder than first portion 22 after the operation concludes, and first portion 22 may become relatively warmer than second portion 23. The relative difference in thermal energy may cause the components in first portion 22 and second portion 23 to expand or contract differently according to their respective coefficients of thermal expansion (CTE). An upper portion, defined with respect to gravity, of HP spool 24, LP spool 26, or components thereof may expand more than a lower portion, resulting in warping of the rotor. The warped rotor may undesirably contact core case 62, resulting in vibration or seizing of the gas turbine engine, a condition which may prevent restart of the engine until additional cooling occurs. Undesired contact may be considered to occur when components designed not to contact each other during operation of engine 18A contact each other during operation. Seizing may be considered to occur when this undesired contact prevents at least one shaft of engine 18A from rotating around engine centerline 49.

In some examples, gas turbine engine 18A may include temperature sensor 64A within first portion 22, and may additionally include temperature sensor 64B within second portion 23. Although illustrated as being located within bypass duct 30, it should be understood that temperature sensors 64A, 64B may be positioned within core case 62 and configured to measure the temperature of their respective portions within core case 62.

Figure 3:
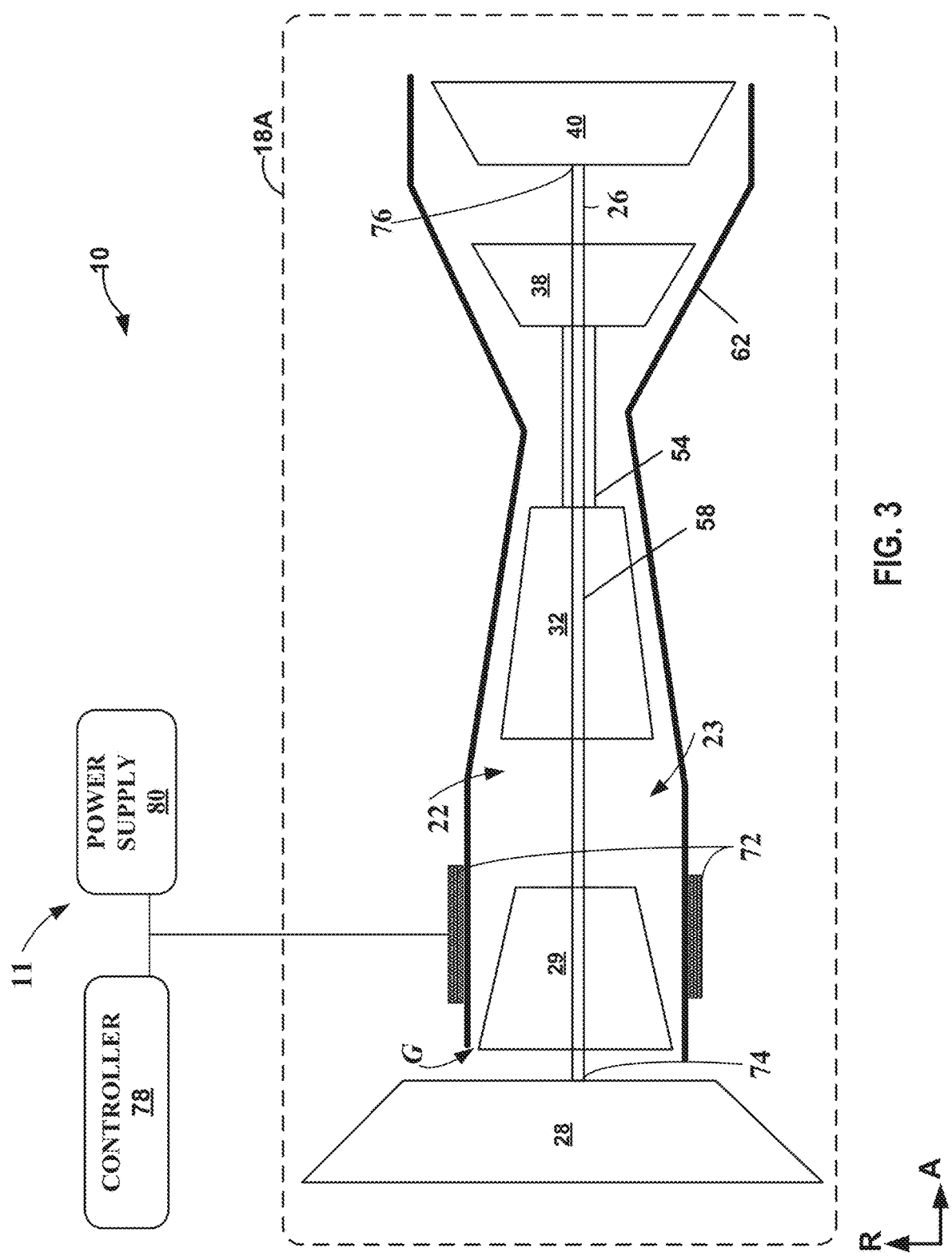
FIG. 3 is a conceptual diagram illustrating an example system for adding thermal energy to one or more portions of a gas turbine engine in accordance with one or more examples of the present disclosure.

FIG. 3 is another example of a schematic functional diagram illustrating a portion of an additional configuration and components of engine system 18A of FIGS. 1 and 2, and like features are similarly numbered. As noted above, engine system 18A may be a gas turbofan system. Engine 18A may include propulsor rotor system 28 that is rotationally coupled to low-pressure turbine 40 by low-pressure shaft 58, and HP compressor 32 rotationally coupled to HP turbine 38 by HP shaft 54. The speed of HP shaft 54 driving the HP compressor 32 may be different from that of the speed of shaft 58 driving the propulsor rotor system 28. The combination of HP compressor 32, HP turbine 38 and HP shaft 54 may be referred to as the HP spool assembly 24 or HP spool 24.

Engine 18A of FIG. 3 includes low-pressure compressor 29. Low-pressure compressor 29 is coupled to rotationally coupled to low-pressure turbine 40 by low-pressure shaft 58. In some examples, low-pressure compressor 29 may be referred to as a booster. In some examples, low-pressure compressor 29 may be similar to that of HP compressor 32 and may include a compressor rotor system (not shown in detail in FIG. 3). In various examples, the compressor rotor system includes one or more rotors (not shown) that are powered by low-pressure turbine 40. Low-pressure compressor 29 may also include a plurality of compressor vane stages (not shown in FIG. 3) that cooperate with compressor blades (not shown) of the compressor rotor system to compress air. In various examples, the compressor vane stages may include a compressor discharge vane stage and/or one or more diffuser vane stages. In one form, the compressor vane stages are stationary. In other examples, one or more vane stages may be replaced with one or more counter-rotating blade stages. In operation, low-pressure compressor 29 may operate to increase the pressure of the intake air, which is then further increase in pressure by HP compressor 32. The combination of propulsor system 28, low-pressure compressor 29, low-pressure turbine 40 and low-pressure shaft 58 may be referred to as the low-pressure spool assembly 26 or low-pressure spool 26.

Gas turbine engine 18A of FIG. 3 includes thermal energy system 11. Thermal energy system 11 is configured to add thermal energy to first portion 22 and second portion 23 of engine 18A to reduce or eliminate undesired contact or seizing of one or more rotors of the rotor system of low-pressure compressor 29 with core case 62. The added thermal energy may thermally expand core case 62 to increase gap G between core case 62 and one or more rotors contained within core case 62 to reduce or eliminate the undesired contact from a thermally expanded rotor system after an operation of gas turbine engine 18A. Controller 78 is configured to cause thermal energy system 11 to supply power from power supply 80 to add thermal energy to gas turbine engine 18A to reduce or eliminate undesired contact or seizing of the engine. For example, the low-pressure shaft 58 may extend from first end 74 at propulsor system 28 to a second end 76 at low-pressure turbine 40 along axial direction A. The added thermal energy from thermal energy system 11 may, in some examples, reduce warping of shaft 58 or components attached to shaft 58 in radial direction R.

Power supply 80 is configured to supply power to electrical heater mat 72. As such, power supply 80 may be any suitable power supply, such as electrical power from a power system onboard vehicle 10. In some examples, power supply 80 may be sourced and generated onboard vehicle 10, such as from a battery cell. It is also considered that power supply 80 may merely be a transport system configured to deliver power generated offboard vehicle 10 to electrical heater mat 72. For example, power supply 80 may be ground power, shore power, marine power, or the like, which may be available at a hangar, a dock, or the like.

Electrical heater mat 72 may be attached to an outer surface of core case 62 as illustrated. In other examples, electrical heater mat 72 may be attached to outer case 60 (FIG. 2). In examples where electrical heat mat 72 is attached to outer case 60 (FIG. 2), electrical heat mat may surround all or a portion of second portion 23 below engine centerline 49 (FIG. 2). In this way, thermal energy system 11 may be configured to add thermal energy to a lower portion of engine 18A to counteract or offset the natural migration of thermal energy upward within engine 18A. Although described herein as a single mat, in some examples electrical heater mat 72 may include more than one discrete electrical heater mat.

In some examples, electrical heater mat 72 may be attached to a radially inner surface of the case, toward engine centerline 49 (FIG. 2). Electrical heater mat 72 may include any suitable material configured to withstand the environment inside gas turbine engine 18A. In some examples, electrical heater mat 72 may extend along all or a portion of the axial length of gas turbine engine 18A. However, power requirements may drop if thermal energy is added to only a portion of core case 62 and or outer case 60. For example, only a bottom portion, such as a 120 degree arc around positioned at the bottom of the case may be heated, reducing the power requirements. Additionally, electrical heater mats may be positioned along the axial length of core case 62 (FIG. 2) or outer case 60 (FIG. 2) where thermal expansion of the case is desired maintain gap G between the case and the rotor system of low-pressure compressor 29, HP compressor 32, or both. As such, in some examples thermal energy system 11 may be configured to add thermal energy to a compressor section of gas turbine engine 18A.

Controller 78 may be configured to control the components of engine 18A and/or aircraft 10 individually and selectively such that engine 18A and system 10 more generally implement the techniques described herein. Controller 78 may comprise any suitable arrangement of hardware, software, firmware, or any combination thereof, to perform the techniques attributed to controller 78 herein. Examples of controller 78 include any of one or more microprocessors, digital signal processors (DSPs), application specific integrated circuits (ASICs), field programmable gate arrays (FPGAs), processing circuitry, or any other equivalent integrated or discrete logic circuitry, as well as any combinations of such components. When controller 78 includes software or firmware, controller 78 further includes any necessary hardware for storing and executing the software or firmware, such as one or more processors or processing units. In some examples, all or portions of controller 78 may be embodied in a full authority digital engine control (FADEC) including an electronic engine controller (EEC) or engine control unit (ECU) and related accessories that control one or more aspects of the operation of engine system 18A.

In general, a processing unit may include one or more microprocessors, DSPs, ASICS, FPGAs, or any other equivalent integrated or discrete logic circuitry, as well as any combinations of such components. Although not shown in FIG. 3, controller 78 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 78 (e.g., may be external to a package in which controller 78 is housed).

Although controller 78 is generally described as being the primary unit for controlling each of the engine components of gas turbine engine 18A for performing the techniques described herein, in some examples, the individual components of gas turbine engine 18A may include additional functionality for performing some or all the operations described below with respect to controller 78. For example, a combination of one or more of HP compressor 32, turbines 38, 40, propulsor 28, low-pressure compressor 29, and the like may include components for controlling the operation of gas turbine engine 18A in the manner described herein.

In some examples, controller 78 may be configured to detect conclusion of an operation of gas turbine engine 18A (e.g., detect shutdown of the engine). Responsive to detecting conclusion of the operation of gas turbine engine 18A, controller 78 may be configured to execute a technique for mitigating problems due to uneven cooling. For example, controller 78 may be configured to cause thermal energy system 11 to add thermal energy to gas turbine engine 18A, or to transport thermal energy form a first portion 22 of gas turbine engine 18A to second portion 23 of gas turbine engine 18A.

In examples where electrical heater mat 72 are attached to the bottom of case 60 such that thermal energy system 11 is configured to only add thermal energy to second portion 23, controller 78 may be configured to receive a signal indicative of a temperature of first portion 22 from temperature sensor 64A (FIG. 2). Similarly, controller 78 may be configured to receive a signal indicative of a temperature of second portion 23 from temperature sensor 64B (FIG. 2), cause power from power supply 80 to be delivered to electrical heater mat 72 to such that the temperature in second portion 23 of substantially matches the sensed temperature in first portion 22. Substantially matches, as described herein, means equal temperature or within a threshold matching percentage of the sensed temperature in first portion 22. For example, thermal energy system 11 may add thermal energy to second portion 23 until the temperature sensed at temperature sensor 64B is within about 10%, or within about 20%, or within about 30% of the temperature sensed at temperature sensor 64A in first portion 22. Controller 78 may be programmed to calculate the thermal energy based on the mass of case 60, the specific heat capacity of the materials of construction of case 60, and the difference between the temperature sensed at temperature sensor 64A and temperature sensor 64B. In some examples, controller 78 may be configured to cease adding or transporting thermal energy to second portion 23 once the temperature in second portion 23 reaches the temperature threshold set by the threshold matching percentage, which may allow for smaller batteries and/or less energy consumption by thermal energy system 11.

Controller 78 may be configured to cause thermal energy system 11 to add thermal energy via electrical heater mat 72 during a time period that begins after operation of gas turbine engine 18A (e.g., when engine 18A is shut down after a flight). The addition of thermal energy may be configured in a number of ways. In some examples, the thermal energy may be configured to heat second portion 23 up to the temperature of first portion 22 once, for example in a relatively short burst of added thermal energy to expand case 60, case 62, or both just prior to a restart attempt. In another example, thermal energy system 11 may be configured to offset at least a portion of the migration of thermal energy upward from second portion 23 to first portion 22 as engine 18A cools. In such instances, thermal energy system 11 may be configured to add thermal energy throughout a time period that begins after the operation of gas turbine engine 18A concludes. In some examples, the time period may be from about 15 minutes to about five hours in duration.

Furthermore, in some modes, thermal energy system 11 may be configured to add progressively less thermal energy to second portion 23 of engine 18A as engine 18A cools from the operating temperature to the ambient temperature (e.g., thermal energy system 11 may temporally taper the amount of thermal energy added to second portion 23). For example, thermal energy system 11 may add thermal energy through a time period that begins after engine 18A is shut down. The time period may be broken into a first segment and a second segment, and thermal energy system 11 may be configured to add more thermal energy during the first segment than is added during the second segment. In this way, engine 18A may be allowed to cool to the temperature of the environment while thermal energy system 11 adds thermal energy to prevent seizing of the rotor system of low-pressure compressor 29 throughout the cooling process. Adding thermal energy via electrical heater mat 72 attached to outer case 60 or inner case 62 may be relatively simple as an add-on solution to address problems associated with uneven cooling. Electrical heater mat 72 may, in some examples, be removed and stored for after another engine prior to restart, or may be a permanent solution (e.g., may remain on the engine during flight).

In some examples, in addition to or alternatively to heating the case with electrical heater mat 72 as discussed above with reference to FIG. 3, thermal energy systems according to the present disclosure may employ inductive heating, which may more directly add thermal energy rotors and shafts of the engine core. Adding thermal energy by inductive heating of the rotor may more directly remedy a warped rotor due to uneven cooling by targeting the added thermal energy to the impacted area.

Figure 4:
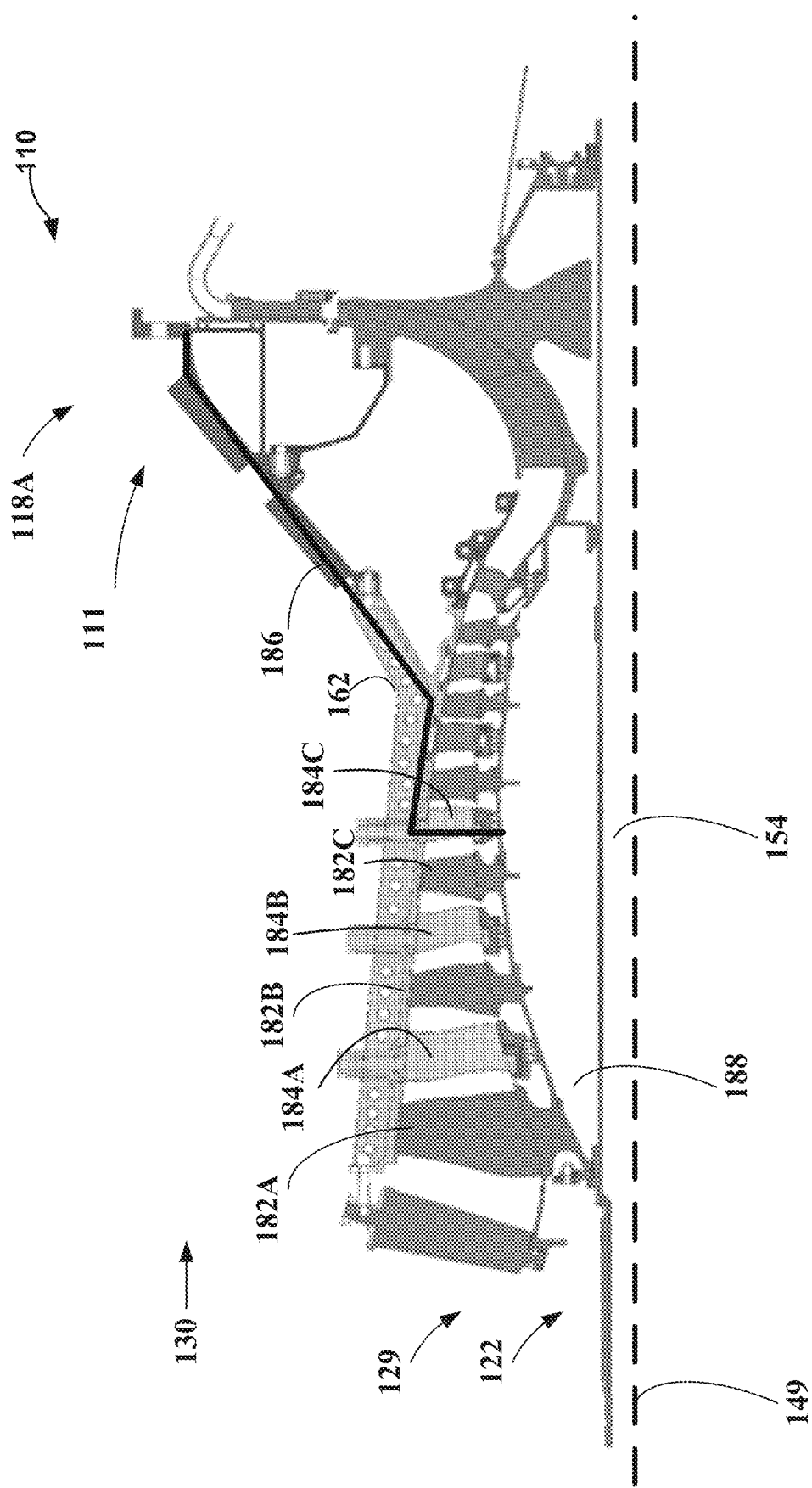
FIG. 4 is a conceptual diagram illustrating a cross-sectional view of a portion of a compressor section of a gas turbine engine in accordance with one or more examples of the present disclosure.

FIG. 4 is a conceptual diagram illustrating a cross-sectional view of a first portion 122 of compressor 129 of a gas turbine engine 118A located onboard vehicle 110. Gas turbine engine 118A may be an example of gas turbine engine 18A of FIGS. 1-3, and compressor 129 may be an example of low-pressure compressor 29 or high-pressure compressor 32 of FIG. 3, where similar reference numerals indicate similar elements. Although only first portion 122 located above engine centerline 149 is illustrated in FIG. 4 for clarity, it should be considered that a second portion (not shown in FIG. 4) located below engine centerline 149 may be similarly configured as a mirror image to the illustrated first portion 122.

Compressor 129 is mounted on shaft 154 and includes rotor body 188. Mounted on rotor body 188 are compressor rotor blades 182A, 182B, 182C (collectively, "compressor rotor blades 182). Compressor 129 is surrounded by core case 162, onto which are mounted compressor vanes 184A, 184B, 184C (collectively, "compressor vanes 184"). As mentioned above, compressor blades 182 and compressor vanes 184 are configured to cooperate to compress air. Compressor vanes 184 may be hollow, and may in some examples define a channel fluidically connecting the engine core volume with bypass duct 130.

In the illustrated example, thermal energy system 111 is configured to add thermal energy via induction heating.

Thermal energy system 111 may be configured to cause a current in induction heating material, which may be in the form of induction coil 186. Induction coil 186 may, in some examples, be a conductive wire. Controller 78 (FIG. 3) may be configured to cause the current in induction coil 186 using power from power supply 80. Induction coil 186 may be configured to pass through hollow compressor vane 184C to define an electrical transmission route through hollow compressor vane 184C. Although illustrated as a single induction coil 186 passing through compressor vane 184C, in some examples thermal energy system 111 may include more than one induction coil 186, which may pass through any or all of compressor vanes 184 or the space between compressor vanes 184 and compressor blades 182 to inductively heat rotor body 188 and/or another portion of a rotor or shaft of gas turbine 118A. Furthermore, although illustrated as only approaching rotor body 188 at a single point, in some examples induction coil may approach rotor body 188 at a plurality of points, or even wrap around at least a portion of rotor body 188 and/or shaft 154.

Figure 5:
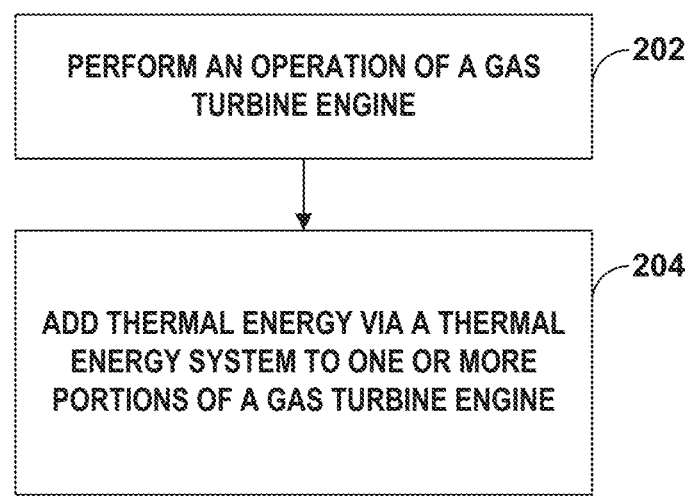
FIG. 5 is a flow diagram illustrating an example technique for mitigating or preventing undesired contact or seizing of a rotor, in accordance with one or more examples of the disclosure.

FIG. 5 is a flow diagram illustrating an example technique for mitigating or preventing undesired contact or seizing of a rotor, in accordance with one or more examples of the disclosure. Although described below primarily with respect to thermal energy system 11 of gas turbine 18A of FIGS. 1-3 and thermal energy system 111 of gas turbine 118 of FIG. 4, the technique of FIG. 5 may be performed with other thermal energy systems, and the described thermal energy systems may be used to perform other techniques.

The technique of FIG. 5 includes performing an operation of gas turbine engine 18A (202). In some examples, the operation may be a propulsion operation, such as a flight, in examples where the vehicle is an aircraft. In some examples, the operation may not include a flight, such as a taxi operation to parking.

The technique of FIG. 5 includes adding thermal energy, subsequent to performing the operation and via thermal energy system 111, to one or more portions 22, 23 of gas turbine engine 18A (204). The thermal energy is configured to minimize or prevent undesired contact or seizing of rotor 24, 26 with another component of the gas turbine engine, such as core case 62, due to warping of the rotor due to uneven cooling of the gas turbine engine 18A after the operation. With concurrent reference to FIGS. 3 and 5, in some examples, rotor 26 extends in an axial direction A from first end 74 to second opposite end 76, and wherein the added thermal energy is configured to minimize or prevent rotor 26 from warping in radial direction R. In some examples, thermal energy system 11 may add thermal energy to first portion 22 located above engine centerline 49 of gas turbine engine 18A. The added thermal energy may thermally expand core case 62 to accommodate warping of rotor 26 in radial direction R. Additionally, or alternatively, in some examples thermal energy system 11 may add thermal energy to second portion 23 located below engine centerline 49. The added thermal energy may thermally expand a bottom portion of rotor 26 to counteract the warping of rotor 26 due to the natural migration of thermal energy retained from the operation in an upward direction relative to gravity.

In some examples, the technique of FIG. 5 may further include stopping rotation of rotor 26, and maintaining rotor 26 in a substantially stationary position during the addition of the thermal energy by thermal energy system 11. In other words, the technique of FIG. 5 may, in some examples, be substituted for barring of gas turbine engine 18A to promote more even cooling, which may be beneficial in instances where barring is prohibited.

In some examples, adding thermal energy via thermal energy system 11 may include adding thermal energy during a time period that begins after the operation of the gas turbine engine concludes. The time period is from about 15 minutes to about five hours in duration. In some examples, the time period is divided into a first segment and a second segment, and adding thermal energy comprises adding more thermal energy during the first segment than is added during the second segment.

With concurrent reference to FIGS. 2 and 5, in some examples, the technique of FIG. 5 includes sensing a temperature in first portion 22 of gas turbine engine 18A with temperature sensor 64A. The technique may include adding thermal energy to second portion 23 of gas turbine engine 18A such that the temperature sensed at temperature sensor 64B in second portion 23 of gas turbine engine 18A substantially matches the sensed temperature in the first portion of the gas turbine engine.

Referring to FIGS. 3 and 5, In some examples, the technique of FIG. 5 may include generating with power supply 80 of thermal energy system 11 the thermal energy for adding to the one or more portions of the gas turbine engine. In some examples, thermal energy system 11 may generate the thermal energy by converting energy stored in one or more battery cells. In some examples, thermal energy system 11 may add thermal energy to second portion 23 of compressor 29. In some examples, the one or more portions of gas turbine engine 18A to which the thermal energy is added consists of a portion of a section along axis A that includes compressor 29.

With reference to FIGS. 4 and 5, in some examples, adding thermal energy with thermal energy system 11 may include induction heating. Induction heat may include inducing a current in induction coil 186, and passing induction coil 186 through hollow compressor vane 184C, induction heating comprises passing electricity through an electrical transmission route through a hollow vane of the gas turbine engine.

Figure 6:
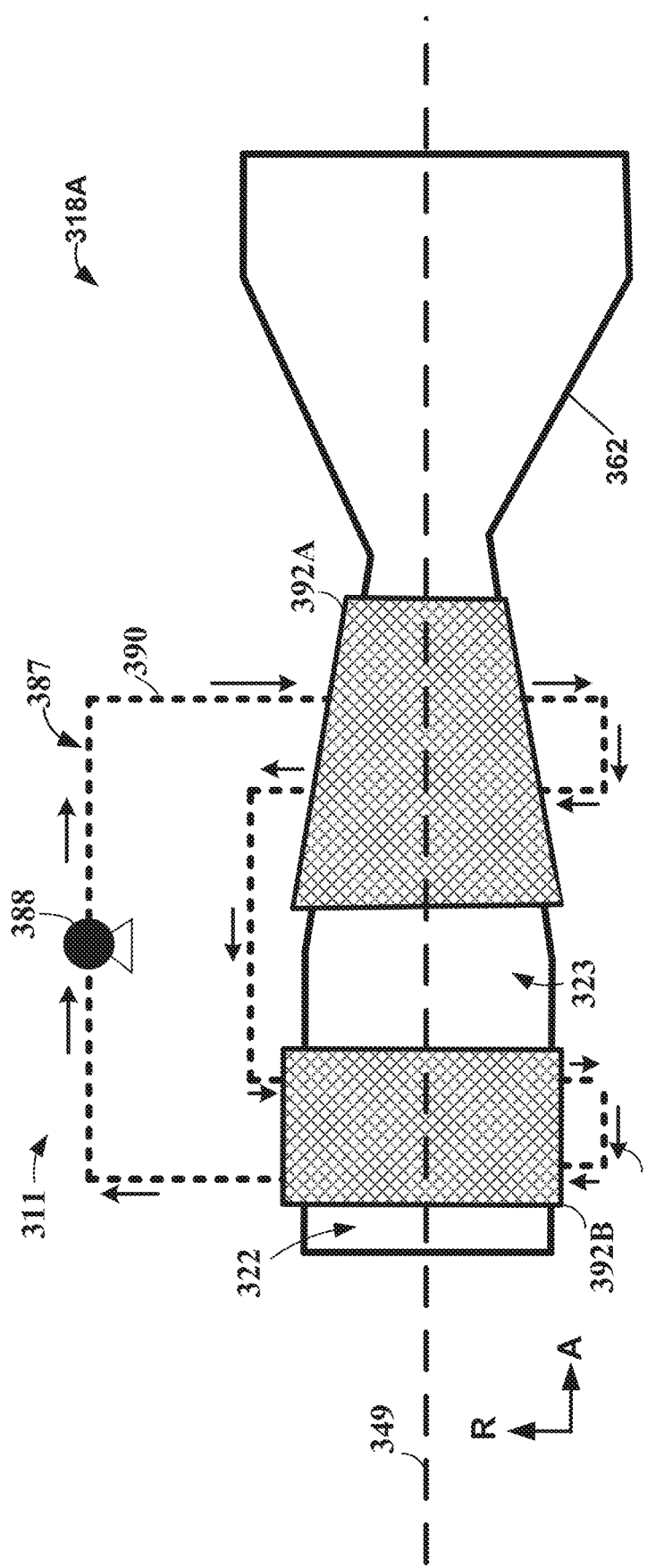
FIG. 6 is a conceptual side-view diagram illustrating an example system for transporting thermal energy harvested from a first portion of a gas turbine engine to a second portion of a gas turbine engine, in accordance with one or more examples of the present disclosure.

In some examples, in additional to or instead of adding thermal energy to a gas turbine engine, thermal energy systems according to the present disclosure may be configured to transport thermal energy a relatively hot portion of the gas turbine engine to a relatively cold portion of the gas turbine engine. FIG. 6 is a conceptual side-view diagram illustrating example thermal energy system 311 for transporting thermal energy from first portion 322 of gas turbine engine 318A to second portion 323 of gas turbine engine. Gas turbine engine 318A of FIG. 6 may be an example of gas turbine engine 18A of FIGS. 1-3 or gas turbine engine 118A of FIG. 4. In some examples, thermal energy system 311 may be configured to redistribute the retained thermal energy to offset the natural migration of thermal energy upward. In this way, thermal energy system 311 may be configured to promote even cooling of gas turbine engine 318A. Thermal energy may be transported from first portion 322 to second portion 323 by fluid 387, which may flow through fluid transport system 390 as illustrated by the arrows in FIG. 6. Fluid 387 may flow through a cavity within jacket 392A and or jacket 392B (collectively, "jackets 392") from a first portion 322, which may be relatively hotter than second portion 323 due to the upward migration of retained thermal energy as described above.

Jackets 392 may be fluidically connected to fluid transport system 390, which may include energy input device 388. In some examples, fluid 387 may be a liquid, and energy input device 388 may be a pump configured to flow fluid 387 throughout fluid transport system 390, such that fluid 387 receives thermal energy from first portion 322 and transports the received thermal energy to second portion 323. For example, fluid 387 may include an oil, water, a refrigerant, or the like. Since fluid 387 is typically only cycled through thermal energy system 311 during a period of time after shutdown to mitigate problems associated with rotor bow, fluid 387 should be selected to remain in liquid form during periods that thermal energy system 311 is not activated (e.g., in flight).

It is also considered that fluid 387 may be air, and energy input device 388 may be a fan configured to flow fluid 387 throughout fluid transport system 390 in a similar fashion. In some examples, as will be further described below, fluid 387 may be configured to change between a gaseous state and a liquid state.

Although thermal energy system 311 of FIG. 6 does not add thermal energy to the gas turbine engine system, but rather is configured to minimize or prevent undesired contact or seizing of a rotor (24, 26, FIG. 2) with another component of the gas turbine engine (e.g., core case 362) by transporting energy from first portion 322 to second portion 323 via fluid 387 flowing through a cavity (not illustrated) in jackets 392, thermal energy system 311 may otherwise generally be described similarly to thermal energy system 11 of FIGS. 1-3 and thermal energy system 111 of FIG. 4. For example, thermal energy system 311 may be advantageous where gas turbine engine 318A is not mechanically supported in a central segment of a rotor (26, FIG. 2).

Figure 7:
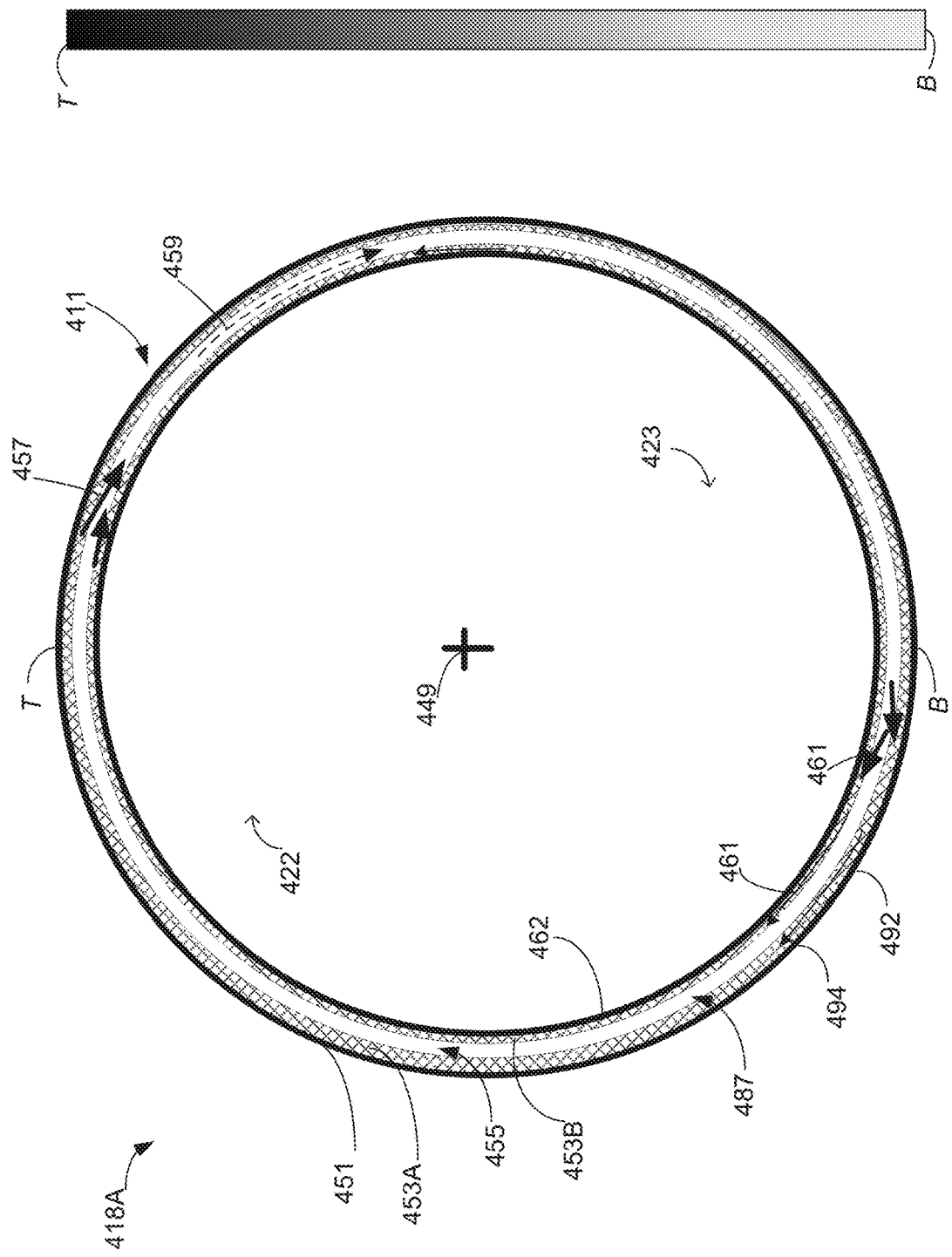
FIG. 7 is a conceptual cross-sectional diagram of an example gas turbine engine taken in a radial direction. The gas turbine engine is surrounded by an example heat pipe, in accordance with one or more examples of the present disclosure.

FIG. 7 is a conceptual cross-sectional diagram of a portion of gas turbine engine 418A taken in a radial direction, such that engine centerline 449 extends into and out of the page. Gas turbine engine 418A may be an example of gas turbine engine 18A of FIGS. 1-3, gas turbine engine 118A of FIG. 4, or gas turbine engine 318A of FIG. 6, differing as described below. Core components of gas turbine engine 418A within core case 462 are omitted for clarity.

Gas turbine engine 418 core case 462 extend from a top T to a bottom B, defined with respect to a force of gravity. In the bar to the right of core case 462, an example schematic of a temperature gradient is illustrated. Top T of first portion 422 is the hottest portion of core case 462, as illustrated by the darkest color. Conversely, bottom B is the coolest portion of core case 462, as illustrated by the lightest color. Thermal energy system 411 may be configured to offset the natural tendency of engine 418A to develop the illustrated temperature gradient, and thus may mitigate or prevent undesired contact or seizure of gas turbine engine 418A.

Thermal energy system 411 is configured to transport thermal energy from first portion 422 to second portion 423. Thermal energy system 411 includes jacket 492 surrounding core case 462 (or outer case 60, FIG. 2). Jacket 492 is configured as a heat pipe in the illustrated example, and will now be referred to as heat pipe 494. Heat pipe 494 may be a single heat pipe of a plurality of heat pipes in a network, which may be disposed at various axial lengths along engine centerline 449. In some examples, thermal energy system 411 may include a second heat pipe (not illustrated) and/or a third heat pipe (not illustrated). In examples where the second heat pipe and/or third heat pipe are included, the second heat pipe and/or third heat pipe may from first portion 422 to second portion 423, or may extend to a third portion of the gas turbine engine different than second portion 423. Transporting heat to the third portion of the gas turbine engine may minimize or prevent undesired contact or seizing of a rotor with another component of the gas turbine engine due to warping of the rotor due to uneven cooling of the gas turbine engine after the operation.

Heat pipe 494 is defined between casing 451 and core case 462. Heat pipe 494 includes wick layer 453A adjacent to casing 451 and wick layer 453B adjacent to core case 462. In some examples, wick layer 453B may be omitted. Between wick layers 453A and 453B is cavity 455. In some examples, wick layer 453A and/or wick layer 453B may include a ceramic, a metal, an alloy, or combinations thereof. Wick layer 453A and/or wick layer 453B may include a structure of groves extending in an axial direction.

Heat pipe 494 may be configured to at least partially passively transport thermal energy from first portion 422 to second portion 423. Passively transport, as described herein, may mean that thermal energy is transmitted without energy input by power supply 80 (FIG. 2). As such, in some examples, thermal energy system 411 may include one or more heat pipes 494 rather than or in addition to the actively pumped fluid system 311 as described in FIG. 6.

Heat pipe 494 contains fluid 487, which may include a refrigerant. Fluid 487 may transport thermal energy from first portion 422 to second portion 423. For example, fluid 487 may receive thermal energy from first portion 422 at or near top T of core case 462. The received thermal energy may cause fluid 487 to evaporate from a liquid state in wick layer 453A and/or wick layer 453B. The evaporated fluid 487 in a gaseous state may migrate into cavity 455, as illustrated by arrow 457. The evaporated fluid may migrate along arrow 459 within cavity 455 towards bottom B, where the partial pressure of fluid 487 may be lower because the temperature may be relatively lower. In second portion 423, fluid 487 may condense from a gaseous state to a liquid state. Fluid 487, now in a liquid state, may migrate from cavity 455 into one of wick layers 453, where fluid 487 may migrate by capillary action back toward first portion 422, as illustrated by arrows 461. In this way, thermal energy system 411 may transport thermal energy from first portion 422 to second portion 423 via heat pipe 494.

Figure 8:
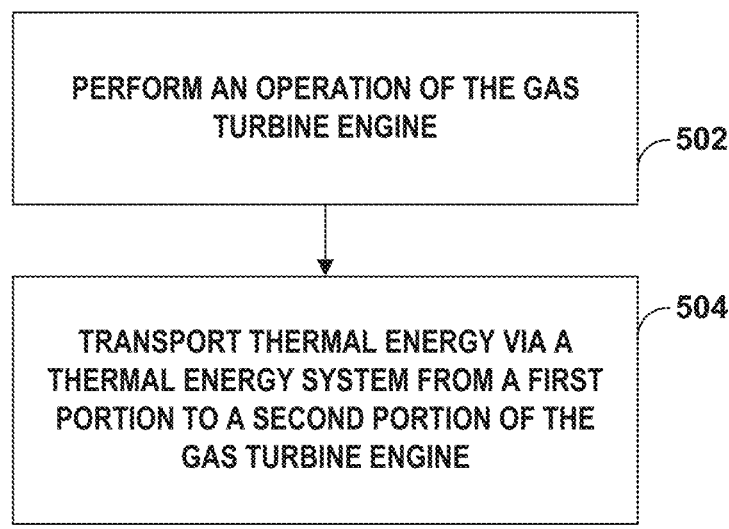
FIG. 8 is a flow diagram illustrating an example technique for mitigating or preventing undesired contact or seizing of a rotor, in accordance with one or more examples of the disclosure.

FIG. 8 is a flow diagram illustrating an example technique for mitigating or preventing undesired contact or seizing of a rotor, in accordance with one or more examples of the disclosure. Although described below primarily with respect to thermal energy system 311 of gas turbine 318A of FIG. 6 and thermal energy system 411 of gas turbine 418 of FIG. 7, the technique of FIG. 8 may be performed with other thermal energy systems, and the described thermal energy systems may be used to perform other techniques.

The technique of FIG. 8 includes performing an operation of a gas turbine engine (502). In some examples, the operation may be a propulsion operation, such as a flight.

The technique of FIG. 8 may include transporting, subsequent to performing the operation and via a thermal energy system 311, thermal energy from first portion 322 of gas turbine engine 318A to second portion 323 of gas turbine engine (504). The thermal energy is configured to minimize or prevent undesired contact or seizing of rotor (24, 26, FIG. 2) with another component of the gas turbine engine 318 (e.g., core case 362) due to warping of rotor (24, 26, FIG. 2) due to uneven cooling of the gas turbine engine after the operation. Transporting the thermal energy may include flowing fluid 387 through a cavity (not illustrated) in transport system 390, which may include jacket 392, from first portion 322 to second portion 323.

In some examples, with reference to FIG. 3 and FIG. 8, rotor 26 may extend in axial direction A from first end 74 to second opposite end 76. The added thermal energy is configured to minimize or prevent rotor 26 from warping in radial direction R. In some examples, rotor 26 is not mechanically supported in a central rotor segment (not labeled) located between first end 74 and second end 76. In some examples, the technique of FIG. 5 may further include stopping rotation of rotor 26, and maintaining the rotor in a remain stationary after the operation during the transportation of the thermal energy.

In some examples, transporting thermal energy may include transporting thermal energy from first portion 322 located above engine centerline 49 (FIG. 2) to second portion 23 of gas turbine engine 18A. In some examples, second portion 23 may be located below engine centerline 49.

In some examples, transporting thermal energy via thermal energy system 11 may include transporting thermal energy during a time period that begins after the operation of the gas turbine engine concludes. In some examples, the time period is from about 15 minutes to about five hours in duration. In some examples, the time period is divided into a first segment and a second segment, and adding thermal energy comprises adding more thermal energy during the first segment than is added during the second segment.

With concurrent reference to FIGS. 2 and 8, in some examples, the technique of FIG. 8 includes sensing a temperature in first portion 22 of gas turbine engine 18A with temperature sensor 64A. The technique may include transporting thermal energy from first portion 22 to second portion 23 of gas turbine engine 18A such that the temperature sensed at temperature sensor 64B in second portion 23 of gas turbine engine 18A substantially matches the sensed temperature in the first portion of the gas turbine engine.

Turning back to FIGS. 6 and 8, in some examples, transporting the thermal energy may include pumping, with energy input device 388, fluid 387 through a cavity in fluid transport system 390. With reference to FIG. 7 and FIG. 8, in some examples, transporting fluid 487 may include transporting fluid 487 through heat pipe 494. Heat pipe 494 may be defined between casing 451 and core case 462. In some examples, casing 451 may define the outer perimeter of the heat pipe. In some examples, wick layer 453A adjacent to casing 451. Wick layer 453A may transport fluid a liquid state from second portion 423 of gas turbine engine 418A to first portion 422 of gas turbine engine 418A, where fluid 487 receives thermal energy from first portion 422.

In some examples heat pipe 494 defines a void portion defining cavity 455. In some examples, cavity 455 transports fluid in a gaseous state from first portion 422 of gas turbine 418A to second portion 423 of gas turbine engine 418A. In some examples, heat pipe 494 is a first heat pipe, and transporting the fluid comprises transporting the fluid through a plurality of heat pipes configured similarly to first heat pipe 494. In some examples, fluid 487 may include at least one of an oil or a refrigerant.

The following numbered clauses may illustrate one or more aspects of the disclosure:

Clause 1A: A system includes one or more heaters configured and positioned to add thermal energy to one or more portions of a gas turbine engine after the gas turbine engine was in operation, wherein the thermal energy minimizes or prevents undesired contact or seizing of a rotor of the gas turbine engine with another component of the gas turbine engine due to warping of the rotor due to uneven cooling of the gas turbine engine after the operation; and a controller configured to control operation of the one or more heaters.

Clause 2A: The system of clause 1A, further comprising the gas turbine engine, the gas turbine engine having the rotor, wherein the rotor extends in an axial direction from a first end to a second opposite end, and wherein the added thermal energy is configured to minimize or prevent the rotor from warping in a radial direction.

Clause 3A: The system of clause 2A, wherein the rotor is not mechanically supported in a central rotor segment located between the first end and the second end.

Clause 4A: The system of any of clauses 1A-3A, wherein the rotor is configured to remain substantially stationary after the operation.

Clause 5A: The system of any of clauses 1A-4A, wherein the one or more heaters are configured to add thermal energy to a portion of the gas turbine engine below an engine centerline.

Clause 6A: The system of any of clauses 1A-5A, wherein the controller is configured to cause the one or more heaters to add the thermal energy during a time period that begins after the operation of the gas turbine engine concludes, wherein the time period is from about 15 minutes to about five hours in duration.

Clause 7A: The system of any of clauses 1A-6A, wherein the controller is configured to cause the one or more heaters to add thermal energy during a time period that begins after the operation of the gas turbine engine concludes, the time period is divided into a first segment and a second segment, and wherein the controller is configured to cause the heater to add more thermal energy during the first segment than is added during the second segment.

Clause 8A: The system of any of clauses 1A-7A, wherein the controller is configured to sense a temperature of the gas turbine engine, and wherein the controller is configured to cause the heater to add thermal energy to the one or more portions of the gas turbine engine such that the temperature in the one or more portions of the gas turbine engine substantially matches the sensed temperature.

Clause 9A: The system of clause 8A, wherein the controller is configured to cause the one or more heaters to cease adding thermal energy responsive to the sensed temperature falling below a temperature threshold.

Clause 10A: The system of any of clauses 1A-9A, wherein the one or more heaters are configured to generate the thermal energy using electrical energy sourced from one or more batteries included in a vehicle that includes the gas turbine engine.

Clause 11A: The system of clause 10A, wherein the one or more batteries are separate from main batteries of the vehicle.

Clause 12A: The system of any of clauses 1A-11A, wherein the one or more portions of the gas turbine engine to which the thermal energy is added comprises a portion of a compressor section below the engine centerline.

Clause 13A: The system of clause 12A, wherein the one or more portions of the gas turbine engine to which the thermal energy is added consists of a portion of the compressor section below the engine centerline.

Clause 14A: The system of clause 9A, further comprising electrical conductors configured to carry the electrical power from the one or more batteries to the one or more heaters, wherein the electrical conductors pass through an electrical transmission route through a hollow vane of the gas turbine engine.

Clause 15A: The system of any of clauses of clauses 1A-14A, wherein the one or more portions of the gas turbine engine include an outer surface of a case of the gas turbine engine, wherein heating the outer surface of the case causes the case to expand to accommodate thermal expansion of the rotor of the gas turbine engine.

Clause 16A: The system of clause 15A, wherein the portion of the outer surface of the case is above a centerline of the gas turbine engine.

Clause 17A: The system of clause 15A, wherein the one or more heaters comprise one or more electrical heater mats.

Clause 18A: A method includes determining, by a controller, that operation of a gas turbine engine has concluded; and responsive to determining that the operation concluded, causing, by the controller, one or more heaters to add thermal energy to one or more portions of the gas turbine engine, wherein the thermal energy is configured to minimize or prevent undesired contact or seizing of a rotor with another component of the gas turbine engine due to warping of the rotor due to uneven cooling of the gas turbine engine after the operation.

Clause 19A: The method of clause 18A, wherein the rotor extends in an axial direction from a first end to a second opposite end, and wherein the added thermal energy is configured to minimize or prevent the rotor from warping in a radial direction.

Clause 20A: The method of clause 18A or 19A, wherein the rotor is not mechanically supported in a central rotor segment located between the first end and the second end.

Clause 21A: The method of any of clauses 18A-20A, further comprising stopping rotation of the rotor, and maintaining the rotor in a substantially stationary position during the addition of the thermal energy.

Clause 22A: The method of any of clauses 18A-21A, wherein the thermal energy is added to a portion of the gas turbine engine below an engine centerline.

Clause 23A: The method of any of clauses 18A-22A, wherein causing the one or more heaters to add the thermal energy comprises causing the one or more heaters to add the thermal energy during a time period that begins after the operation of the gas turbine engine concludes, wherein the time period is from about 15 minutes to about five hours in duration.

Clause 24A: The method of any of clauses 18A-23A, wherein adding thermal energy comprises adding thermal energy during a time period that begins after the operation of the gas turbine engine concludes, wherein the time period is divided into a first segment and a second segment, and wherein adding thermal energy comprises adding more thermal energy during the first segment than is added during the second segment.

Clause 25A: The method of any of clauses 18A-24A, further comprising sensing a temperature of the gas turbine engine, and wherein adding the thermal energy comprises adding thermal energy to the one or more portions of the gas turbine engine such that a temperature of the one or more portions of the gas turbine engine substantially matches the sensed temperature.

Clause 26A: The method of any of clauses 18A-25A, further comprising generating the thermal energy for adding to the one or more portions of the gas turbine engine.

Clause 27A: The method of clause 26A, wherein generating the thermal energy comprises converting energy stored in one or more battery cells.

Clause 28A: The method of any of clauses 18A-28A, wherein the one or more portions of the gas turbine engine to which the thermal energy is added comprises a portion of a compressor section below the engine centerline.

Clause 29A: The system of clause 28A, wherein the one or more portions of the gas turbine engine to which the thermal energy is added consists of a portion of the compressor section below the engine centerline.

Clause 30A: The method of any of clauses 18A-29A, wherein adding thermal energy comprises induction heating.

Clause 31A: The method of clause 30A, wherein induction heating comprises passing electricity through an electrical transmission route through a hollow vane of the gas turbine engine.

Clause 32A: The method of any of clauses of clauses 18A-31A, wherein adding thermal energy comprises adding thermal energy to a portion of an outer surface of a case of the gas turbine engine to cause the case to expand to accommodate thermal expansion of the rotor of the gas turbine engine.

Clause 33A: The method of clause 31A, wherein the portion of the outer surface of the case is above a centerline of the gas turbine engine.

Clause 34A: The method of clause 32A, wherein the thermal energy is added via one or more electrical heater mats.

Clause 1B: A system includes a thermal energy system configured to transport thermal energy harvested from a first portion of a gas turbine engine to a second portion of the gas turbine engine after the gas turbine engine was in operation, wherein the transported thermal energy minimizes or prevents undesired contact or seizing of a rotor with another component of the gas turbine engine due to warping of the rotor due to uneven cooling of the gas turbine engine after the operation, wherein the thermal energy system includes a cavity configured to flow a fluid, wherein the fluid is configured to transport thermal energy from the first portion to the second portion.

Clause 2B: The system of clause 1B, wherein the thermal energy was generated by the gas turbine engine during the operation of the gas turbine engine.

Clause 3B: The system of clause 1B or 2B, further comprising the gas turbine engine, the gas turbine engine having the rotor, wherein the rotor extends in an axial direction from a first end to a second opposite end, and wherein the transported thermal energy is configured to minimize or prevent the rotor from warping in a radial direction that is substantially perpendicular to the axial direction.

Clause 4B: The system of clause 1B-3B, wherein the rotor is not mechanically supported in a central rotor segment located between the first end and the second end.

Clause 5B: The system of any of clauses 1B-4B, wherein the rotor is configured to remain substantially stationary after the operation.

Clause 6B: The system of any of clauses 1B-5B, wherein the first portion is above an engine centerline and the second portion is below an engine centerline.

Clause 7B: The system of any of clauses 1B-6B, wherein the thermal energy system includes a controller configured to transport thermal energy from the first portion to the second portion during a time period that begins after the operation of the gas turbine engine concludes, wherein the time period is from about 15 minutes to about five hours in duration.

Clause 8B: The system of any of clauses 1B-7B, wherein the thermal energy system includes a controller configured to receive a signal indicative of a sensed temperature in the first portion of the gas turbine engine, and wherein the thermal energy system is configured to transport thermal energy from the first portion to the second portion of the gas turbine engine such that the temperature in the second portion of the gas turbine engine substantially matches the sensed temperature in the first portion of the gas turbine engine.

Clause 9B: The system of any of clauses 1B-8B, wherein the second portion of the gas turbine engine comprises a portion of a compressor section of the gas turbine engine below a centerline of the gas turbine engine.

Clause 10B: The system of any of clauses 1B-9B, wherein the cavity is fluidically connected to a pump configured to transport fluid within the cavity, and wherein the thermal energy system further comprises a controller configured to control operation of the pump.

Clause 11B: The system of any of clauses 1B-10B, wherein the thermal energy system comprises one or more heat pipes, a first heat pipe extending from the first portion of the gas turbine engine to the second portion of the gas turbine engine.

Clause 12B: The system of clause 11B, wherein the one or more heat pipes include at least a second heat pipe extending from the first portion of the gas turbine engine to a third portion of the gas turbine engine, wherein heating the third portion of the gas turbine engine minimizes or prevents undesired contact or seizing of a rotor with another component of the gas turbine engine due to warping of the rotor due to uneven cooling of the gas turbine engine after the operation.

Clause 13B: The system of clause 12B, wherein the heat pipe comprises: a casing defining the outer perimeter of the heat pipe; a wick layer adjacent to the casing, wherein the wick layer is configured to transport fluid in a liquid state from the second portion of the gas turbine engine to the first portion of the gas turbine engine where the fluid is configured to receive thermal energy from the first portion of the gas turbine engine; and a void portion defining the cavity, wherein the cavity is configured to transport fluid in a gaseous state from the first portion of the gas turbine engine to the second portion of the gas turbine engine, wherein the fluid is configured to condense from a gaseous state to a liquid state in the second portion.

Clause 14B: The system of any of clauses 1B-13B, further comprising the fluid, wherein the fluid comprises at least one of an oil or a refrigerant.

Clause 15B: A method includes performing an operation of a gas turbine engine; and transporting, subsequent to performing the operation and via a thermal energy system, thermal energy from a first portion of the gas turbine engine to a second portion of the gas turbine engine, wherein the thermal energy is configured to minimize or prevent undesired contact or seizing of a rotor with another component of the gas turbine engine due to warping of the rotor due to uneven cooling of the gas turbine engine after the operation, wherein transporting the thermal energy includes flowing a fluid through a cavity from the first portion to the second portion.

Clause 16B: The method of clause 15B, wherein the rotor extends in an axial direction from a first end to a second opposite end, and wherein the added thermal energy is configured to minimize or prevent the rotor from warping in a radial direction.

Clause 17B: The method of clause 15B or 16B, wherein the rotor is not mechanically supported in a central rotor segment located between the first end and the second end.

Clause 18B: The method of any of clauses 15B-17B, further comprising stopping rotation of the rotor, and maintaining the rotor in a remain stationary after the operation during the transportation of the thermal energy.

Clause 19B: The method of any of clauses 15B-18B, wherein the second portion of the gas turbine is engine below an engine centerline.

Clause 20B: The method of any of clauses 15B-19B, wherein transporting thermal energy comprises transporting thermal energy during a time period that begins after the operation of the gas turbine engine concludes, wherein the time period is from about 15 minutes to about five hours in duration.

Clause 21B: The method of any of clauses 15B-20B, wherein transporting thermal energy comprises transporting the thermal energy during a time period that begins after the operation of the gas turbine engine concludes, wherein the time period is divided into a first segment and a second segment, and wherein adding thermal energy comprises adding more thermal energy during the first segment than is added during the second segment.

Clause 22B: The method of any of clauses 15B-21B, further comprising sensing a temperature in a first portion of the gas turbine engine, and wherein transporting the thermal energy comprises transporting the thermal energy to a second portion of the gas turbine engine such that the temperature in the second portion of the gas turbine engine substantially matches the sensed temperature in the first portion of the gas turbine engine.

Clause 23B: The method of any of clauses 15B-22B, wherein the second portion of the gas turbine engine to which the thermal energy is added comprises a portion of a compressor section below the engine centerline.

Clause 24B: The method of clause 23B, wherein second portion of the gas turbine engine to which the thermal energy is transported consists of a portion of the compressor section below the engine centerline.

Clause 25B: The method of any of clauses 15B-24B, wherein the transporting the fluid through the cavity comprises pumping the fluid.

Clause 26B: The method of any of clauses 15B-25B, wherein transporting the fluid comprises transporting the fluid through a heat pipe, the heat pipe includes a casing defining the outer perimeter of the heat pipe; a wick layer adjacent to the casing, wherein the wick layer is configured to transport fluid in a liquid state from the second portion of the gas turbine engine to the first portion of the gas turbine engine where the fluid is configured to receive thermal energy from the first portion of the gas turbine engine; and a void portion defining the cavity, wherein the cavity is configured to transport fluid in a gaseous state from the first portion of the gas turbine engine to the second portion of the gas turbine engine.

Clause 27B: The method of clause 26B, wherein the heat pipe is a first heat pipe, and wherein transporting the fluid comprises transporting the fluid through a plurality of heat pipes configured similarly to the first heat pipe.

Clause 28B: The method of any of clauses 15B-27B, wherein the fluid comprises at least one of an oil or a refrigerant.

Various examples have been described. These and other examples are within the scope of the following examples and claims.

What is claimed is:
1. A system comprising:
one or more heaters configured and positioned to add thermal energy to one or more portions of a gas turbine engine after the gas turbine engine was in operation, wherein the thermal energy minimizes or prevents undesired contact or seizing of a rotor of the gas turbine engine with another component of the gas turbine engine due to warping of the rotor due to uneven cooling of the gas turbine engine after the operation;

one or more batteries, wherein the one or more heaters are configured to generate the thermal energy using electrical energy sourced from the one or more batteries included in a vehicle that includes the gas turbine engine;

one or more electrical conductors, wherein the one or more electrical conductors are configured to carry the electrical energy from the one or more batteries to the one or more heaters, wherein the one or more electrical conductors pass through an electrical transmission route through a hollow vane of the gas turbine engine; and a controller configured to control operation of the one or more heaters.

2. The system of claim 1, further comprising the gas turbine engine, the gas turbine engine having the rotor, wherein the rotor extends in an axial direction from a first end to a second opposite end, and wherein the added thermal energy is configured to minimize or prevent the rotor from warping in a radial direction.

3. The system of claim 1, wherein the rotor is configured to remain stationary after the operation.

4. The system of claim 1, wherein the one or more heaters are configured to add thermal energy to a portion of the gas turbine engine below an engine centerline.

5. The system of claim 1, wherein the controller is configured to cause the one or more heaters to add the thermal energy during a time period that begins after the operation of the gas turbine engine concludes, wherein the time period is from 15 minutes to five hours in duration.

6. The system of claim 1, wherein the controller is configured to cause the one or more heaters to add thermal energy during a time period that begins after the operation of the gas turbine engine concludes, wherein the time period is divided into a first segment and a second segment, and wherein the controller is configured to cause the one or more heaters to add more thermal energy during the first segment than is added during the second segment.

7. The system of claim 1, wherein the controller is configured to sense a temperature of the gas turbine engine, and wherein the controller is configured to cause the one or more heaters to add thermal energy to the one or more portions of the gas turbine engine such that the temperature in the one or more portions of the gas turbine engine matches the sensed temperature.

8. The system of claim 7, wherein the controller is configured to cause the one or more heaters to cease adding thermal energy responsive to the sensed temperature falling below a temperature threshold.

9. The system of claim 1, wherein the one or more batteries are separate from main batteries of the vehicle.

10. The system of claim 1, wherein the one or more portions of the gas turbine engine to which the thermal energy is added comprises a portion of a compressor section below an engine centerline.

11. The system of claim 10, wherein the one or more portions of the gas turbine engine to which the thermal energy is added consists of a portion of the compressor section below the engine centerline.

12. The system of claim 1, wherein the one or more portions of the gas turbine engine include an outer surface of a case of the gas turbine engine, wherein heating the outer surface of the case causes the case to expand to accommodate thermal expansion of the rotor of the gas turbine engine.

13. The system of claim 12, wherein the portion of the outer surface of the case is above a centerline of the gas turbine engine.

14. The system of claim 12, wherein the one or more heaters comprise one or more electrical heater mats.

15. A method comprising:

determining, by a controller, that operation of a gas turbine engine has concluded; and responsive to determining that the operation concluded;

transporting electrical energy sourced from one or more batteries to one or more heaters via one or more electrical conductors which pass through an electrical transmission route through a hollow vane of the gas turbine engine, and adding, via the one or more heaters, thermal energy to one or more portions of the gas turbine engine, wherein the thermal energy is configured to minimize or prevent undesired contact or seizing of a rotor with another component of the gas turbine engine due to warping of the rotor due to uneven cooling of the gas turbine engine after the operation.

16. The method of claim 15, wherein the rotor extends in an axial direction from a first end to a second opposite end, and wherein the added thermal energy is configured to minimize or prevent the rotor from warping in a radial direction.

* * * * *